United States Patent
Khrenov et al.

(10) Patent No.: US 8,598,280 B2
(45) Date of Patent: Dec. 3, 2013

(54) POLY(METH)ACRYLIMIDE HAVING IMPROVED OPTICAL AND COLOR PROPERTIES, PARTICULARLY UNDER THERMAL LOAD

(75) Inventors: Victor Khrenov, Frankfurt (DE); Krzysztof Sado, Mainz (DE); Nils Mehler, Brensbach (DE); Klaus Schultes, Wiesbaden (DE); Klaus Albrecht, Mainz (DE)

(73) Assignee: Evonik Roehm GmbH, Darmstadt (DE)

( * ) Notice: Subject to any disclaimer, the term of this patent is extended or adjusted under 35 U.S.C. 154(b) by 401 days.

(21) Appl. No.: 12/922,627

(22) PCT Filed: Feb. 27, 2009

(86) PCT No.: PCT/EP2009/052380
§ 371 (c)(1),
(2), (4) Date: Sep. 14, 2010

(87) PCT Pub. No.: WO2009/135703
PCT Pub. Date: Nov. 12, 2009

(65) Prior Publication Data
US 2011/0015317 A1 Jan. 20, 2011

(30) Foreign Application Priority Data
May 9, 2008 (DE) .......................... 10 2008 001 695

(51) Int. Cl.
C08F 8/32 (2006.01)
C08F 8/30 (2006.01)
C08F 8/40 (2006.01)

(52) U.S. Cl.
USPC ............... 525/330.4; 524/135; 525/330.5; 525/340; 525/379; 525/329.9

(58) Field of Classification Search
USPC ............... 525/329.9, 330.4, 330.5, 340, 379; 524/135
See application file for complete search history.

(56) References Cited

U.S. PATENT DOCUMENTS

| | | | |
|---|---|---|---|
| 4,833,221 A | 5/1989 | Albrecht | |
| 5,110,877 A | 5/1992 | Hoess et al. | |
| 5,155,172 A | 10/1992 | Siol et al. | |
| 5,219,931 A | 6/1993 | Siol et al. | |
| 5,270,397 A | 12/1993 | Rhein et al. | |
| 5,280,073 A | 1/1994 | Siol et al. | |
| 5,338,805 A * | 8/1994 | Besecke et al. | 525/330.5 |
| 5,476,907 A * | 12/1995 | Besecke et al. | 525/330.4 |
| 5,530,080 A | 6/1996 | Siol et al. | |
| 5,548,033 A | 8/1996 | Vetter et al. | |
| 5,612,417 A | 3/1997 | Rhein et al. | |
| 5,652,316 A | 7/1997 | May et al. | |
| 5,705,189 A | 1/1998 | Lehmann et al. | |
| 5,726,245 A | 3/1998 | Numrich et al. | |
| 5,837,780 A * | 11/1998 | Albrecht et al. | 525/379 |
| 6,040,387 A | 3/2000 | Albrecht et al. | |
| 6,077,911 A * | 6/2000 | Besecke et al. | 525/329.9 |

(Continued)

FOREIGN PATENT DOCUMENTS

| | | |
|---|---|---|
| DE | 199 53 955 | 5/2001 |
| DE | 100 52 239 | 5/2002 |

(Continued)

OTHER PUBLICATIONS

U.S. Appl. No. 11/748,874, filed May 15, 2007, Schultes, et al.

(Continued)

*Primary Examiner* — David W Wu
*Assistant Examiner* — Deve E Valdez
(74) *Attorney, Agent, or Firm* — Oblon, Spivak, McClelland, Maier & Neustadt, L.L.P.

(57) ABSTRACT

Process for preparing molding materials MM with improved optical and color properties, consisting of a polymer PM which contains units of the formula I

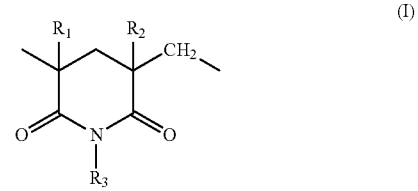

in which $R_1$ and $R_2$ are each hydrogen and methyl and $R_3$ is hydrogen, $C_1$-$C_{18}$-alkyl, $C_5$-$C_8$-cycloalkyl, $C_6$-$C_{10}$-aryl, $C_6$-$C_{10}$-aryl-$C_1$-$C_4$-alkyl, where these radicals may be up to trisubstituted by radicals selected from the group consisting of $C_1$-$C_4$-alkoxy and halogen, prepared in an imidation reaction known per se in a reactive extruder,
in which, on completion of the imidation reaction, an amount of one or more reducing phosphorus compounds P which is effective for color stabilization is added to the polymer PM, characterized in that the phosphorus compounds are organic phosphorus compounds OP selected from the group consisting of compounds of the formula II

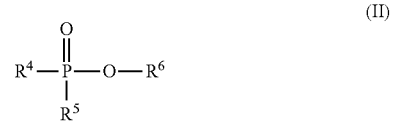

in which $R^4$ and $R^5$ are each independently hydrogen or an aromatic 6-membered ring which may be up to pentasubstituted by a $C_1$-$C_4$-alkyl and/or $C_5$-$C_8$-cycloalkyl groups. Shaped bodies obtainable by the process, especially light waveguides, have a low tendency to yellowing under thermal stress, coupled with a low haze, and also a stable and high transparency.

20 Claims, No Drawings

(56) References Cited

U.S. PATENT DOCUMENTS

| | | |
|---|---|---|
| 6,214,942 B1 | 4/2001 | Siol et al. |
| 6,287,470 B1 | 9/2001 | Vetter et al. |
| 6,355,712 B1 | 3/2002 | Schultes et al. |
| 6,576,255 B1 | 6/2003 | Petereit et al. |
| 6,613,871 B2 | 9/2003 | Hoess et al. |
| 6,765,046 B1 | 7/2004 | Numrich et al. |
| 6,803,416 B2 | 10/2004 | Schultes et al. |
| 6,809,163 B2 | 10/2004 | Schultes et al. |
| 6,890,993 B2 | 5/2005 | Schultes et al. |
| 6,998,140 B2 | 2/2006 | Meier et al. |
| 7,179,852 B2 | 2/2007 | Schultes et al. |
| 7,371,795 B2 | 5/2008 | Wicker et al. |
| 7,381,552 B2 | 6/2008 | Menzler et al. |
| 7,456,239 B2 | 11/2008 | Theil et al. |
| 7,498,044 B2 | 3/2009 | Petereit et al. |
| 7,498,373 B2 | 3/2009 | Schmitt et al. |
| 7,585,565 B2 | 9/2009 | Schultes et al. |
| 7,605,193 B2 | 10/2009 | Schultes et al. |
| 7,682,698 B2 | 3/2010 | Schultes et al. |
| 7,683,131 B2 | 3/2010 | Goldacker et al. |
| 7,695,813 B2 | 4/2010 | Schultes et al. |
| 7,754,317 B2 | 7/2010 | Neuhaeuser et al. |
| 7,790,079 B2 | 9/2010 | Hoess et al. |
| 7,879,938 B2 | 2/2011 | Hager et al. |
| 2002/0160042 A1 | 10/2002 | Petereit et al. |
| 2004/0104501 A1 | 6/2004 | Petereit et al. |
| 2005/0062203 A1 | 3/2005 | Haas et al. |
| 2005/0080188 A1 | 4/2005 | Schultes et al. |
| 2005/0090568 A1 | 4/2005 | Stein et al. |
| 2006/0035992 A1 | 2/2006 | Stein et al. |
| 2006/0052515 A1 | 3/2006 | Schultes et al. |
| 2006/0121248 A1 | 6/2006 | Lorenz et al. |
| 2006/0175735 A1 | 8/2006 | Hoess et al. |
| 2006/0281887 A1 | 12/2006 | Petereit et al. |
| 2007/0055017 A1 | 3/2007 | Schultes et al. |
| 2007/0142588 A1 | 6/2007 | Scherble et al. |
| 2007/0222117 A1 | 9/2007 | Hoess et al. |
| 2007/0276093 A1 | 11/2007 | Schultes et al. |
| 2008/0132627 A1 | 6/2008 | Schultes et al. |
| 2008/0248298 A1 | 10/2008 | Numrich et al. |
| 2008/0281023 A1 | 11/2008 | Numrich et al. |
| 2008/0305335 A1 | 12/2008 | Schultes et al. |
| 2009/0043044 A2 | 2/2009 | Schwarz-Barac et al. |
| 2009/0105399 A1 | 4/2009 | Schultes et al. |
| 2009/0176928 A1 | 7/2009 | Schultes et al. |
| 2009/0226730 A1 | 9/2009 | Hoess et al. |
| 2010/0098907 A1 | 4/2010 | Schultes et al. |
| 2010/0098908 A1 | 4/2010 | Schultes et al. |
| 2010/0148401 A1 | 6/2010 | Schultes et al. |
| 2010/0167045 A1 | 7/2010 | Schultes et al. |
| 2010/0174022 A1 | 7/2010 | Schultes et al. |
| 2010/0189983 A1 | 7/2010 | Numrich et al. |
| 2010/0213636 A1 | 8/2010 | Schmidt et al. |
| 2011/0009539 A1 | 1/2011 | Goldacker et al. |
| 2011/0269883 A1 | 11/2011 | Battenhausen et al. |
| 2011/0290300 A1 | 12/2011 | Battenhausen et al. |

FOREIGN PATENT DOCUMENTS

| | | |
|---|---|---|
| DE | 102 59 674 | 7/2004 |
| DE | 103 40 330 | 3/2005 |
| EP | 0 576 877 | 1/1994 |
| EP | 0 776 932 A1 | 6/1997 |
| EP | 1 516 711 | 3/2005 |
| WO | 03 072647 | 9/2003 |
| WO | 2004 025268 | 3/2004 |

OTHER PUBLICATIONS

U.S. Appl. No. 60/831,222, filed Jul. 17, 2006, Hager, et al.
U.S. Appl. No. 13/241,776, filed Sep. 23, 2011, Hoess, et al.
Chinese Office Action issued Mar. 7, 2012 in patent application No. 200980113267.9 with English translation.
U.S. Appl. No. 13/058,364, filed Feb. 10, 2011, Golchert, et al.
Russian Office Action Issued Feb. 6, 2013 in Patent Application No. 2010 150 254.

* cited by examiner

POLY(METH)ACRYLIMIDE HAVING IMPROVED OPTICAL AND COLOR PROPERTIES, PARTICULARLY UNDER THERMAL LOAD

The invention relates to the preparation, processing and use of heat distortion-resistant thermoplastics, especially of moulding materials based on imidated polymethyl methacrylate. It describes moulding materials which, after processing to shaped bodies, for example for light guide applications, have a high transparency (>90%), low haze (<1%) and only a small increase in the yellowness index under thermal stress.

More particularly, the invention relates to a process for preparing moulding materials according to the preamble of Claim 1.

Polymers based on imidated polymethyl methacrylate are a particular class of high-transparency and at the same time particularly heat distortion-resistant thermoplastics. Shaped bodies made of this material can be exposed to significantly higher temperatures over prolonged periods than shaped bodies made of other high-transparency thermoplastics, for example polymethyl methacrylate (PMMA). Of course, the elevated thermal stress also increases the risk of discoloration. In order to use these high-performance thermoplastics, for example for the coverage of lamps, it is necessary to protect them as far as possible from thermal discoloration, visible as an increase in the yellowness index. The yellowness index is measured to DIN 6167 (D65/10) or to ASTM D 1925.

For other applications, for example as light guides, this resistance to yellowing at relatively high temperatures is, however, not the only crucial criterion. For example, in the case of light guides, thermal stability (especially long-term stability) also plays an important role but a subordinate role compared with the simultaneous reduction of yellowness index and haze with simultaneously high transparency. In this connection and within the present application, the haze is determined to ISO 14782 (first edition 1999 Aug. 15) and the transparency is measured to ISO 13468-2.

RD 321 114 describes a process for reducing the yellowness of polymethacrylimides by performing the imidation in an oxygen-free atmosphere. Removal of the oxygen can be achieved here only through a complicated distillation process, which is economically unfavourable.

EP-A 576 877 describes a polymer based on polymethacrylimide and polyacrylimide with low yellowness index, wherein inorganic salts of phosphinic acid or phosphoric acid are added in the imidation reaction.

The imidation reaction consists in a reaction of a polymer based on $C_1$-$C_{20}$-alkyl radicals of methacrylic acid and/or of acrylic acid with ammonia or a primary alkyl-substituted amine. It is effected at high pressures and high temperatures in the melt or in solution. According to EP-A 576 877, the phosphorus compound is added to the reaction mixture and thus exposed to these drastic conditions. The result is a moulding material which has relatively low yellowing. In the examination of this prior art by the applicant, however, it was found that the shaped bodies produced from these moulding materials exhibit significant yellowing phenomena under thermal stress. It is initially only at a low level with regard to yellowness index; however, with increasing duration of thermal stress, the yellowness index rises gradually. A stabilizing action by the reducing phosphorus compound which has been added beforehand is barely perceptible here. It can therefore be assumed that it has substantially been consumed or has decomposed under the imidation conditions.

The use amounts of the phosphorus compounds are correspondingly high, presumably in order to compensate for a loss of action: preference is given to using amounts of 0.1-1% by weight based on the amount of polymers to be imidated. An increase in the amount added is barely an option because other properties of the polymer are worsened: according to the applicant's findings, even in the case of an addition of more than 0.1% by weight of the reducing phosphorus compound, haze occurs in the polymer.

An indication for decomposition of the reducing phosphorus compound in the process addressed here might be that the evolution of phosphine, especially at high use concentrations, was registered in experiments by the applicant corresponding to EP-A 576 877. One of the decomposition reactions which is assumed to take place here is accordingly a disproportionation of the hypophosphite.

EP-A 0 776 932, which constitutes the generic preamble, discloses the addition of inorganic hypophosphites as yellowness index-reducing stabilizers. The exclusively inorganic reducing phosphorus compounds are not used during the imidation reaction, but rather added subsequently to the polymethylmethacrylimide. The amounts of stabilizer (sodium hypophosphite) used in the examples of EP-A 0 776 932 to achieve the yellowness indices described are 0.5% by weight or 1% by weight. At such high stabilizer concentrations, the stabilized PMMI, however, has a comparatively high haze value which is prohibitive for a number of applications. For instance, it is evident from the examples of EP-A 0 776 932, especially Examples 8 to 10, that the haze also increases with increasing content of sodium hypophosphite. At a content of 2000 ppm, for example, haze values of approx. 10 are measured. However, these are simply unacceptable for particular applications (for example for light guides), Even though, according to EP-A 0 776 932, stabilized moulding materials enable the production of shaped bodies which have a yellowness index of <2 or even <1, there is still a need for improved, especially more stable moulding materials which, as well as a low yellowness value and a high long-term stabilization at relatively high temperatures and/or under prolonged stress, also possess a very low haze coupled with high transparency.

The use of reducing organic phosphorus compounds as antioxidants which are intended, inter alia, to prevent the discoloration of polymer moulding materials under thermal stress is known (cf., for example, Kirk-Othmer, Encyclopedia of Chemical Technology, 3rd. Ed., Vol. 3, page 133, Wiley, New York, 1978). In some cases, they are also added to the moulding materials before processing, i.e. in the compounding step. For instance, according to Japanese application Kokai Tokkyo JP 60 123 547, an improvement in the discoloration of copolymers formed from methyl methacrylate, styrene and maleic anhydride monomer units is observed under injection moulding conditions at relatively high temperatures when such copolymers, before processing by injection moulding, are admixed with at least one phosphaphenanthrene derivative and additionally a sterically hindered phenol, a thiopropionic ester or a phosphoric ester as stabilizers against oxidative degradation.

Jpn. Kokai Tokkyo Koho JP 60 120 735 describes copolymers formed from methyl methacrylate, vinylaromatic and copolymerized cyclic anhydrides, whose thermal stability is increased and whose discoloration under thermal stress is prevented by adding in the melt, for example in the course of injection moulding, phosphoric esters and further stabilizers based on sterically hindered phenols.

Jpn. Kokai Tokkyo Koho JP 03 167 245 claims the stabilization of copolymers formed from methyl methacrylate, N-substituted maleimides and further copolymerizable monomers with compounds selected from the group of the alkyl-substituted triaryl phosphites, the dialkylpentaerythritol diphosphites and the phosphaphenanthrene derivatives.

Jpn. Kokai Tokkyo Koho JP 63 163 306 includes copolymers formed from methyl methacrylate and $C_8$-$C_{20}$-alkyl methacrylate as a core material for optical light guide fibres, which comprise, as stabilizers, phosphites, for example sterically hindered diarylpentaerythritol diphosphites or thiophosphites to prevent the discoloration of the copolymers under thermal stress.

The 4 Japanese patents cited here all specify sterically hindered, organic phosphites, or organic phosphites together with sterically hindered phenols.

JP 010 79 202 discloses an imidation of copolymers based on MMA/maleic anhydride. It is pointed out that the devolatilization of the reaction product formed in the presence of phosphite stabilizers leads to a moulding material with relatively low yellowness index.

JP 05 070 652 A discloses the use of various organic phosphites and phosphonites as stabilizers in the processing of imidated polyacrylates and polymethacrylates. The corresponding stabilizers are incorporated subsequently into the polymer matrix by a compounding step.

EP 463 754 states that the use of trialkyl phosphites or aliphatic bicyclic diphosphites leads to the reduction of the yellowness index of PMMI. In addition, it is stated that these stabilizers also bring about long-term colour stability of PMMI.

EP 396 336 A discloses the use of sterically hindered organophosphites and -phosphonites. As in patent application EP 463 754 A1, the possibility of adding stabilizers in the course of imidation is also mentioned here, but only the subsequent incorporation of stabilizers is described.

Finally, DE 4 219 479 A claims that hypophosphites have a yellowness index-stabilizing action when added during the preparation. However, the patent is restricted exclusively to inorganic hypophosphites. Moreover, the patent mentions that the addition of organic phosphorus-containing stabilizers leads to a deterioration in the optical properties (including yellowness index).

Polymethylmethacrylimide (PMMI) moulding materials are notable for a unique combination of physical properties and are used for various specific applications in the motor vehicle and optics sector. A combination of high heat distortion resistance, transparency and good weathering stability impart a special position in these market segments to the PMMI moulding materials.

As a result of their high heat distortion resistance, a very high energy supply is required in the course of preparation (reactive extrusion of PMMA) and further processing of PMMI moulding materials. The thermal stress arising through the shearing and heating, to which both the polymer molecules and the reagents (or by-products to be removed) are exposed, leads to various side reactions (including decomposition reactions). As a result, various unsaturated structures can form, which can cause a deterioration in optical properties (including development of intrinsic colour, transparency losses). It is common knowledge that, in the definition of polymer compounds, various stabilizers are very often used. Their use allows the deterioration in material properties to be prevented or controlled.

In view of the prior art cited and discussed herein, it was an object of the present invention, through the use of suitable stabilizers or stabilizing packages, to improve PMMI moulding materials and also shaped bodies significantly with regard to the optical values. Furthermore, the good optical properties should also be maintained during the use period of the PMMI shaped bodies. In addition, the moulding materials of the invention should be preparable in one step by a simple process. Specifically, it was an object of the invention to improve the yellowness index and its permanence to such an extent that no troublesome haze has to be accepted.

These objects and further objects which are not stated explicitly but are immediately discernible from the introductory discussion are achieved in a process for preparing moulding materials MM with improved colour stability under thermal stress according to the preamble of Claim 1, with the features of the characterizing part of Claim 1. Advantageous process modifications are the subject-matter of the claims referring back to the independent process claim.

By virtue of, in the process cited at the outset, the phosphorus compounds being organic phosphorus compounds OP selected from the group consisting of the compounds of the formula II

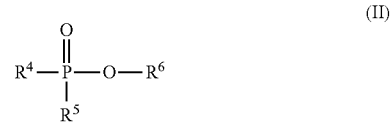

(II)

in which $R^4$ and $R^5$ are each independently hydrogen or an aromatic 6-membered ring which may be up to pentasubstituted by a $C_1$-$C_4$-alkyl radical, where at least one of the $R^4$ and $R^5$ radicals is not hydrogen, and $R^6$ is hydrogen or an alkali metal, alkaline earth metal, aluminium or ammonium which may be substituted by up to four $C_1$-$C_4$-alkyl and/or $C_5$-$C_8$-cycloalkyl groups, it is possible in a not immediately foreseeable manner to provide colour-stable moulding materials MM which possess excellent long-term colour stability even in the event of significant and/or prolonged thermal stress and which simultaneously have both advantageous haze and high transparency. This profile of properties of PMMI moulding materials is unique to date in this combination.

The starting material for the process according to the invention is a finished polymer PM based on poly(meth)acrylimide. The polymer PM contains units of the formula I

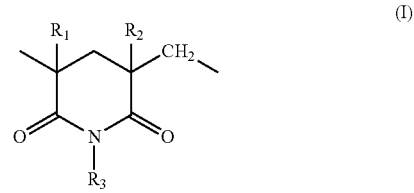

(I)

in which $R_1$ and $R_2$ are each hydrogen and methyl and $R_3$ is hydrogen, $C_1$-$C_{18}$-alkyl, $C_5$-$C_8$-cycloalkyl, $C_6$-$C_{10}$-aryl, $C_6$-$C_{10}$-aryl-$C_1$-$C_4$-alkyl, where these radicals may be up to trisubstituted by radicals selected from the group consisting of $C_1$-$C_4$-alkyl, $C_1$-$C_4$-alkoxy and halogen.

The process for preparing the polymer PM does not affect the present invention; the prior art on this subject is assumed. The preparation of the starting material is disclosed, for example, in DE-A 40 02 904, EP-A 234 726, U.S. Pat. No. 4,246,374, U.S. Pat. No. 3,246,374, EP-A 396 336 and EP-A 576 877.

The structure described in formula I is present in the polymer to an extent of at least 5% by weight, preferably to an extent of at least 30% by weight, more preferably to an extent of at least 60% by weight, where the imide group is preferably substituted by methyl ($R_3$=methyl). $R_1$ and $R_2$ in formula I are also preferably methyl groups. The particularly preferred polymer accordingly contains (N-methyl)dimethylglutarimide units. As a result of the preparation, the polymer may contain not only glutarimide units but also small amounts of acid and anhydride units, and also residual (meth)acrylic esters. When the imidation is performed on a polymer which contains styrene, alpha-methylstyrene, methacrylonitrile, vinyl acetate or other ethylenically unsaturated comonomers such as ethylene or butadiene, they remain unaffected by the reaction and form a constituent of the polymer composition of the starting material PM for the process according to the invention.

The preferred polymers based on poly-N-methylmethacrylimide are particularly heat distortion-resistant thermoplastics. According to the degree of methylation of the imide group, their Vicat value is 120° C. to more than 200° C. The former values are achieved at low degrees of imidation around 5%, the latter at high degrees of imidation, where only some of the substituents on the imide group are methyl radicals.

The reducing organic phosphorus compounds OP obey the formula II

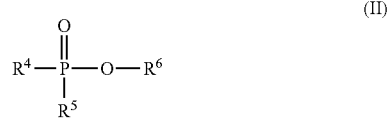

in which $R^4$, $R^5$ and $R^6$ may each independently assume the definition specified hereinabove.

The reducing organic phosphorus compounds OP contain phosphorus in the +1 oxidation state. In this context, salts of phosphinic acid (hypophosphites) and the free acids themselves are industrially readily available. It is explicitly pointed out that these are organic derivatives of phosphinic acid. It is unimportant whether the salts or the free acids are present in the ortho or the meta form or else, for example, as dimers. It is possible to use alkali metal, alkaline earth metal, aluminium and ammonium salts, where the ammonium ion may be substituted by up to four $C_1$-$C_4$-alkyl and/or $C_5$-$C_8$-cycloalkyl groups.

Of particular interest for the further processing are the stabilizers of the formula II which are based on phosphorus (oxidation state 1) and which additionally possess a free P—H bond. These include those compounds of the formula II in which $R^4$ or $R^5$ is hydrogen. Substances of such a structure may also be particularly suitable as stabilizers for finished PMMI shaped bodies.

Among the compounds of the formula (II), those of particular interest are also those in which one of the $R^4$ and $R^5$ radicals is hydrogen and the other radical is an aromatic 6-membered ring, preferably a phenyl radical. Just like the salts of benzenephosphinic acid, benzenephosphinic acid has been found to be particularly effective.

In yet another modification of the process of the invention, combinations of two or more compounds of the formula II have been found to be useful. A specific process advantageously has, as the reducing organic phosphorus compound OP, benzenephosphinic acid in a mixture with sodium benzenephosphinate.

Preference is also given to combinations of compounds of the formula II with other phosphorus compounds. For instance, combinations with inorganic or organic phosphites can give rise to particularly advantageous aspects.

Particularly effective and also available inexpensively is sodium hypophosphite. Its use in combination with a compound of the formula II is a preferred embodiment of the invention. Even though, according to the literature, it thermally decomposes readily with disproportionation, it has been found to be useful for the purposes of the invention.

Alkaline earth metal hypophosphites, for example calcium hypophosphite, are more stable. The use of this salt in combination with a compound of the formula II is also a particularly preferred embodiment. It will be appreciated that it is also possible to use salt mixtures.

It is unexpected compared to the prior art relating to the use of reducing inorganic phosphorus compounds that, in accordance with the invention, even ultrasmall concentrations thereof are sufficient. For example, 0.005% by weight based on the polymer already achieves noticeable effects. The maximum effect may be achieved with as little as 0.02 to 0.05% by weight. It is usually inadvisable to select the concentration higher than 0.5% by weight, preferably higher than 0.1% by weight. It is inadvisable to add more than 1% by weight of reducing organic phosphorus compound OP, since certain deteriorations in properties can already be observed here, for example haze in the polymer or reduced weathering stability. Accordingly, preference is given to concentrations of reducing organic phosphorus compounds of at least 0.005% by weight and less than 0.5% by weight, preferably than 0.1% by weight, based on polymeric PM.

When mixtures of organic phosphorus (I) compounds of the formula II with inorganic phosphorus compounds, preferably hypophosphites, are used, the amount used can vary over a wide range.

An appropriate total amount of compounds of the formula II and inorganic phosphorus compound is in the range of 0.005% by weight –1% by weight, where the ratio (w/w) of compound of the formula II to inorganic phosphorus compound is in the range of 100:1 to >1:1. Appropriate ratios are in the range of 5:1 to >1:1.

The inventive organic reducing phosphorus compounds OP are generally applied in solution. Usually, methanol and/or ethanol or another alcohol or an alcohol/water mixture is the most suitable solvent. Advantageously, the reducing phosphorus compounds are used in a solution of maximum concentration. A guide value is a concentration of 50% by weight. It is customary at room temperature. According to the dissolution and application temperature, other concentrations are also possible or necessary, for example 30% by weight to 65% by weight. It is surprising that even such a small volume of reducing agent, as provided by a concentrated solution of the phosphorus compound, can obviously be distributed homogeneously over the entire polymer batch.

However, it is also possible to apply the reducing organic phosphorus compound in powder form, i.e. without use of solvent.

Even though it is possible in principle to add the components of a mixture of reducing phosphorus compounds to the polymer in succession, a mixture or solution of the components will generally be prepared first and this will be added to the polymer in one step. For the homogeneous distribution, a one-component stabilizer is more advantageous.

The addition of blue pigments or blue dyes for optical neutralization of possible yellowness can be dispensed with completely.

According to the invention, the reducing organic phosphorus compound OP is incorporated at a later point in the processing. As a result, premature decomposition of the decolourizing agent appears to be avoidable. In particular, it is not subjected to the high thermal stresses in the imidation, as in the prior art. The addition is never into the reactive extruder, always downstream of the reaction zone.

One possibility is the incorporation of the reducing organic phosphorus compound immediately after completion of the imidation reaction in the vented extruder connected downstream of the reactive extruder. The dosage site is selected such that the addition is effected into the already devolatilized melt. The advantage of this addition method is that no additional processing step is needed and it follows seamlessly on from the reaction.

A further possibility is the addition of the reducing inorganic phosphorus compound to the finished polymer in the course of compounding.

To perform this process according to the invention, the polymer should, if possible, be present in particulate form. Suitable examples are particularly granules or else millbase in a wide variety of different freenesses. Preference is given to selecting a mean particle size of 1-5 mm. The reducing organic phosphorus compound is mixed with the polymer PM present in particulate form typically first in slow-running mixing units, for example drum, drum-hoop or double-chamber ploughshare mixers. Particular preference is given to so-called cavity transfer mixers. The slow-running units bring about mixing without the phase interfaces being eliminated (cf. Ullmanns Enzyklopädie der technischen Chemie, 4th edition, vol. 2, pages 282 to 311, Verlag Chemie, Weinheim, N.Y., 1980). This mixture is processed thermoplastically in the downstream processing step of melting. For this purpose, heatable mixing units are used at the temperatures suitable therefor, generally between 250 and 350° C. For example, such heatable mixing units are single-screw or multiscrew extruders or extruders with an oscillating screw and optionally additionally with shear pins. This process can be used to prepare the inventive moulding materials MM in particle sizes of, for example, 1 to 5 mm.

A further addition variation is that the imidated poly(meth) acrylate which is already present in granulated or ground form is melted again in a separate extruder, and the reducing organic phosphorus compounds OP are added to the melt. It can be pumped in here, for example, as a solution. After cooling and cutting, the inventive moulding material MM is likewise obtained here. Advantageously, this addition variation can be combined with an immediately subsequent shaping processing step.

The inventive moulding materials MM are processed to shaped bodies SB. For this purpose, common art processes such as injection moulding, extruding, pressing, sintering and other shaping processes are suitable. No limits are placed on the configuration of the shaped body. According to their high heat distortion resistance, the emphasis of the application is of course on shaped bodies which are exposed to high temperatures, for example in light guide applications or lenses in illumination technology, and also in mouldings in thermally stressed regions of motor vehicles, such as in headlamp diffusers, rear lights or foglights among other places.

The process for incorporating the reducing organic phosphorus compound is generally an individual, simple process step because the stabilizing agent is added as one component. It is advantageous that there is no need to intervene in the preparation process itself, since the polymer is a common product and is already prepared on the industrial scale. With regard to the amount and the chemical nature of the reducing organic phosphorus compound OP, the process is very inexpensive: only a little stabilizer is needed, which is particularly inexpensive.

The performance advantages are important. For instance, the inventive shaped body is virtually colourless after performance of the process according to the invention. Its yellowness index or $Y_i$—it is measured to DIN 6167 (D65/10) or to ASTM D 1925—is below 2, preferably below 1. Specimens which have not been subjected to the inventive treatment, i.e. which have been compounded without addition of reducing inorganic phosphorus compounds, generally have yellowness indices of more than 3.

Instead of the yellowness index, the transmission of an injection-moulded slab of dimensions 60×45×3 mm can be employed to characterize the optical properties. The transmission of a slab produced in accordance with the invention is close to the theoretical value of 92% transmission, specifically at 86 to 92% according to the degree of imidation. Preference is given to transmission values of >90%, very especially preferably in the range of >90% to 92%, even more preferably of 90.5% or in the range of 90.5% to 92%.

However, the crucial advantage of the process according to the invention is the outstanding colour stability of the shaped body under continuing thermal stress in combination with excellent haze coupled with simultaneously high transparency. Although an increase in the yellowness index is not always entirely avoidable, it is generally significantly lower than in the prior art. Furthermore, the invention very substantially reduces an undesired increase in the haze. The colour stability of a shaped body SB is tested by thermal stress on a test slab in a forced-air drying cabinet at 160° C. for up to 1000 hours of storage time. At particular intervals, the yellowness index is checked, which can be used to compile a curve of the yellowness index increase. Inventive shaped bodies exhibit a yellowness index increase averaging only <0.02 per hour. Even yellowness index increases of less than 0.01 per hour are possible. In the applicant's tests—see examples—yellowness indices of <1.5, in the majority of cases <1.0, were achieved in the course of thermal stress at 160° C. over 800 hours.

The inventive moulding materials also find use in the production of visually demanding mouldings. Specifically in the case of particularly long flow paths and/or complicated moulding geometries, high processing temperatures are needed. Here, the inventive reducing organic phosphorus compounds OP provide stabilization against yellowing of the moulding in the course of its production.

The invention also provides shaped bodies SB obtainable from moulding materials MM as obtainable according to the above-described process.

In a preferred embodiment, such a shaped body is characterized in that it has a yellowness index of <2, preferably <1. The haze is preferably <1.5%, more preferably <1%.

In an advantageous configuration, a shaped body of the invention is characterized in that it has a transparency in the range of >89% to 92%, preferably >90.5% to 92%.

Most preferably, the shaped body SB is a body which is used in light guide applications, and is very particularly appropriately a light waveguide.

The invention will be illustrated in detail hereinafter using examples and if appropriate comparative examples.

EXAMPLE 1

Comparative Without Stabilizer Addition

On a reactive extrusion system consisting of a reactive extruder with a highly effective mixing part and a vented extruder with two venting zones and attached vacuum lines, the polymer-analogous reaction, specifically the imidation, was carried out. 10 kg per hour of a PMMA moulding material were introduced into the reactive extruder. In the first part of the mixing zone, there is a feed point for liquids. 3000 g of methylamine per h were fed into this feed point as the reaction medium. The mean reaction time was 5 minutes at a temperature of 250° C. On completion of the reaction, the reaction mixture was decompressed in the vented extruder, the gaseous and volatile fractions were removed, and finally extrudates were made, cooled and cut to granules.

The resulting product was used, on an Arburg 221 injection moulding machine, to injection-mould a series of 65×40×3 mm specimens, and the yellowness index, transparency and haze were determined thereon to DIN 6167 and ISO 14782. The Vicat softening temperature determined to ISO 306, process B 50, was 172.4° C. Four of the injection-moulded specimens were placed into a forced-air drying cabinet and stored at 160° C. for 1000 hours. After 144 h, 336 h, 504 h, 768 h and 1008 h of storage time, one specimen was removed and cooled. Subsequently, yellowness index, transparency and haze were measured. The following results were obtained:

| Example (comparative) | Yellowness index | Transparency [%] | Haze [%] |
|---|---|---|---|
| 1 | 3.9 | 89.5 | 0.6 |

TABLE 1

| Hot storage at 160° C. (no stabilizer) | | | | | | |
|---|---|---|---|---|---|---|
| Time [h] | 0 | 144 | 336 | 504 | 768 | 1008 |
| Yellowness index | 3.9 | 5.48 | 7.73 | 10.85 | 15.93 | 23.91 |
| Transparency [%] | 89.5 | 89.2 | 88.9 | — | 87 | 85.2 |
| Haze [%] | 0.6 | — | — | — | — | 1.1 |

It is noticeable that the yellowness index even of the unstored samples is much too high without stabilizers. However, the values of haze and transparency still vary within the acceptable range. In the course of hot storage, the yellowness index rises significantly. Transparency and haze also deteriorate with increasing duration of the thermal stress on the samples.

EXAMPLE 2

According to the Invention

Addition of an Organic Hypophosphite to the Finished PMMI Granule

The procedure of Example 1 was repeated except that a 10.4% (% by weight) methanolic solution of benzenehypophosphorous acid (BHPS) was added to the downstream vented extruder at a dosage rate of 0.2 kg/h. The dosage site was selected such that the addition was into the melt which had been freed of volatile and devolatilizable constituents. The end concentration of the BHPS in the PMMI moulding material was 3000 ppm. According to example 1, specimens were produced from the resulting granules and thermally stressed at 160° C. over a period of 1000 h. The following results were obtained:

| Example | Yellowness index | Transparency [%] | Haze [%] |
|---|---|---|---|
| 2 | 1.1 | 90.6 | 0.8 |

TABLE 2

| Hot storage at 160° C. (organic hypophosphite free acid) | | | | | | |
|---|---|---|---|---|---|---|
| Time [h] | 0 | 144 | 336 | 504 | 768 | 1008 |
| Yellowness index | 1.1 | 1.92 | 2.47 | 3.27 | 5.26 | 7.76 |
| Transparency [%] | 90.6 | 90.5 | 90.4 | 90 | 89.7 | 89.1 |
| Haze [%] | 0.8 | — | — | — | — | 0.7 |

It is noticeable that the use of benzenehypophosphorous acid allows good transparency, and lower haze and yellowness index to be achieved. In the course of hot storage, the values of transparency and haze change only insignificantly. Although the yellowness index rises, the level achievable is still acceptable.

EXAMPLE 3

According to the Invention

Addition of an Organic Hypophosphite to the Finished PMMI Granule

The procedure of Example 2 was repeated, except that an 8.4% (% by weight) methanolic solution of benzenehypophosphorous acid sodium salt was added to the downstream vented extruder at a dosage rate of 0.2 kg/h. The end concentration of BHPS sodium salt in PMMI moulding material was 2200 ppm. The following results were obtained:

| Example | Yellowness index | Transparency [%] | Haze [%] |
|---|---|---|---|
| 3 | 0.8 | 90.8 | 0.7 |

TABLE 3

| Hot storage at 160° C. (organic hypophosphite sodium salt) | | | | | |
|---|---|---|---|---|---|
| Time [h] | 0 | 264 | 528 | 768 | 1032 |
| Yellowness index | 0.8 | 2 | 3.57 | 5.98 | 9.02 |
| Transparency [%] | 90.8 | 90.7 | 90.4 | 89.91 | 89.34 |
| Haze [%] | 0.7 | — | — | — | 0.8 |

It is noticeable that the use of benzenehyphophosphorous acid sodium salt likewise allows good transparency, and lower haze and yellowness index to be achieved.

EXAMPLE 4

Comparative Example

Addition of an Inorganic Hypophosphite to the Finished PMMI Granule

The procedure of Example 2 was repeated, except that a 3.75% (% by weight) methanolic solution of sodium hypophosphite was added to the downstream vented extruder at a dosage rate of 0.08 kg/h. The end concentration of the sodium hypophosphite in the PMMI moulding material was 250 ppm. The following results were obtained:

| Example | Yellowness index | Transparency [%] | Haze [%] |
|---|---|---|---|
| 4 | 3.2 | 90.3 | 0.7 |

TABLE 4

Hot storage at 160° C. (inorganic hypophosphite end concentration 1)

| Time [h] | 0 | 100 | 300 | 700 | 1008 |
|---|---|---|---|---|---|
| Yellowness index | 3.2 | 4.1 | 5.0 | 10.3 | — |
| Transparency [%] | 90.2 | 90.2 | 90.0 | 89.0 | — |
| Haze [%] | 0.7 | — | — | 0.89 | — |

EXAMPLE 5

Comparative Example

Addition of an Inorganic Hypophosphite to the Finished PMMI Granule

The procedure of Example 2 was repeated, except that a 3.75% (% by weight) methanolic solution of sodium hypophosphite was added to the downstream vented extruder at a dosage rate of 0.26 kg/h. The end concentration of the sodium hypophosphite in the PMMI moulding material was 750 ppm. The following results were obtained:

| Example | Yellowness index | Transparency [%] | Haze [%] |
|---|---|---|---|
| 5 | 2.2 | 90.4 | 0.9 |

TABLE 5

Hot storage at 160° C. (inorganic hypophosphite end concentration 2)

| Time [h] | 0 | 100 | 300 | 700 | 1008 |
|---|---|---|---|---|---|
| Yellowness index | 2.2 | 3.1 | 4.5 | 8.5 | — |
| Transparency [%] | 90.4 | 90.3 | 90.0 | 89.3 | — |
| Haze [%] | 0.9 | — | — | 1.3 | — |

It is noticeable in Examples 4 and 5 (comparative examples) that sodium hypophosphite and the PMMI melt—in contrast to organic stabilizers (Examples 2 and 3) which have a good compatibility with the PMMI melt and as a result can be distributed homogeneously in the melt at the molecular level—are incompatible with one another. When the inorganic stabilizer is incorporated into PMMI, crystals of sodium hypophosphite form in the polymer. The light scattering caused by this leads to the effect that the haze of shaped bodies increases and prevents the use thereof as light guides.

EXAMPLES 6-8 (ACCORDING TO THE INVENTION) AND EXAMPLES 9-11

Comparative Examples

Subsequent Compounding of Stabilizers 15 kg of the resulting granule were filled into a 30 l stainless steel vat and an appropriate amount of stabilizers was weighed in (see Tables 5-6). Here, stabilizers were added on completion of the imidation reaction but before the compounding. On a tumbling mixer, the components were mixed intimately for 4 minutes and introduced into the funnel of a 25 mm (=d) twin-screw extruder. The mixture was compounded on the twin-screw extruder of length 32×d.

TABLE 6

Subsequent stabilization of PMMI with benzenehypophosphorous acid

| Example | BHPA [ppm] | Transparency [%] | Yellowness index | Haze [%] |
|---|---|---|---|---|
| 6 | 0 | 88.9 | 6.4 | 1.0 |
| 7 | 1000 | 89.7 | 2.3 | 1.9 |
| 8 | 1500 | 89.9 | 1.8 | 1.3 |

TABLE 7

Subsequent stabilization of PMMI with sodium hypophosphite

| Example | Sodium hypophosphite [ppm] | Transparency [%] | Yellowness index | Haze [%] |
|---|---|---|---|---|
| 9 | 100 | 89.5 | 3.2 | 2 |
| 10 | 1000 | 87.8 | 2.9 | 2.5 |
| 11 | 2000 | 83.5 | 2.9 | 10 |

With reference to Examples 6 to 8, it is noticeable that subsequent stabilization of PMMI with organic stabilizers does lead to a decrease in the yellowness index. However, the haze increases when, for instance, Example 2 (3000 ppm of BHPA free acid) is compared with Examples 7 (1000 ppm of BHPA free acid) and 8 (1500 ppm of BHPA free acid). It can be concluded from this that it is advantageous to undertake the dosage of stabilizers into the vented extruder (Examples 2 and 3).

From Examples 9-11, again, it is noticeable that the haze also increases with increasing content of sodium hypophosphite and that, compared with the examples in which BHPA is used as the stabilizer, the haze is comparatively poor.

The invention claimed is:
1. A process for preparing a stabilized molding composition, the molding composition comprising:
a polymer comprising units of formula I:

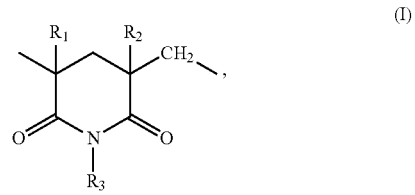

wherein
$R_1$ and $R_2$ are each hydrogen or methyl and
$R_3$ is hydrogen, optionally substituted $C_1$-$C_{18}$-alkyl, optionally substituted $C_5$-$C_8$-cycloalkyl, optionally substituted $C_6$-$C_{10}$-aryl, or optionally substituted $C_6$-$C_{10}$-aryl-$C_1$-$C_4$-alkyl, optionally substituted with up to trisubstituted by radicals selected from the group consisting of $C_1$-$C_4$-alkoxy and halogen, and
at least one reducing organic phosphorous compound of formula II:

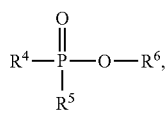

wherein
R⁴ is hydrogen or an aromatic 6-membered ring optionally up to pentasubstituted by at least one of $C_1$-$C_4$-alkyl and $C_5$-$C_8$-cycloalkyl groups, R⁵ is an aromatic 6-membered ring optionally up to pentasubstituted by at least one of $C_1$-$C_4$-alkyl and $C_5$-$C_8$-cycloalkyl groups,
and R⁶ is hydrogen, an alkali metal, an alkaline earth metal, aluminum, ammonium or ammonium optionally substituted with up to four of at least one selected from $C_1$ to $C_4$ alkyl and $C_5$ to $C_8$ cycloalkyl groups;

the process comprising:
adding the at least one reducing organic phosphorous compound to the polymer after completion of an imidation reaction from which the polymer is obtained.

2. The process according to claim 1, wherein the at least one reducing organic phosphorus compound is added in an amount of 0.005 to 1% by weight, based on the polymer weight.

3. The process according to claim 2, wherein the amount of the at least one reducing organic phosphorus compound is from 0.005% to 0.3% by weight, based on the polymer.

4. The process according to claim 1, wherein the at least one reducing organic phosphorus compound of formula (II) is benzenephosphinic acid.

5. The process according to claim 1, wherein the at least one reducing organic phosphorus compound of formula (II) comprises benzenephosphinic acid and sodium benzenephosphinate.

6. The process according to claim 1, wherein the at least one reducing organic phosphorus compound is added in alcoholic solution.

7. The process according to claim 2, wherein the at least one reducing organic phosphorus compound is added to a particulate form of the polymer by mixing, optionally with a cavity transfer mixer.

8. The process according to claim 1, wherein the at least one reducing organic phosphorus compound is added to a melt of the polymer wherein the polymer is freed of volatile constituents.

9. The process according to claim 8, wherein the at least one reducing organic phosphorus compound is added continuously to a vented extruder connected downstream of a reaction extruder.

10. A shaped body obtained by molding the stabilized molding composition prepared according to claim 1.

11. The shaped body according to claim 10, wherein a yellowness index is less than 2.

12. The shaped body according to claim 11, wherein a haze value is less than 1.5%.

13. The shaped body according to claim 12, wherein the haze value is less than 1%.

14. The shaped body according to claim 10, wherein a transparency of the shaped body is from greater than 89% to 92%.

15. The shaped body according claim 14 wherein the transparency is from greater than 90.5% to 92%.

16. The shaped body according to claim 10, wherein the shaped body is a light waveguide.

17. The process according to claim 2, wherein the at least one reducing organic phosphorus compound is benzenephosphinic acid.

18. The process according to claim 3, wherein the at least one reducing organic phosphorus compound is benzenephosphinic acid.

19. The process according to claim 2, wherein the at least one reducing organic phosphorus compound comprises benzenephosphinic acid and sodium benzenephosphinate.

20. A process for preparing molding materials, the molding material consisting of a polymer comprising units of formula I

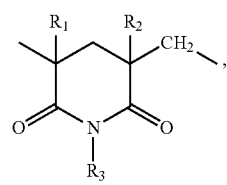

wherein
$R_1$ and $R_2$ are each independently hydrogen or methyl and $R_3$ is hydrogen, $C_1$-$C_{18}$-alkyl, $C_5$-$C_8$-cycloalkyl, $C_6$-$C_{10}$-aryl, or $C_6$-$C_{10}$-aryl-$C_1$-$C_4$-alkyl, optionally, up to trisubstituted by radicals selected from the group consisting of $C_1$-$C_4$-alkoxy and halogen, prepared in an imidation reaction in a reactive extruder, the process comprising, on completion of the imidation reaction,
adding to the polymer an amount of at least one reducing phosphorus compound effective for color stabilization, the at least one phosphorus compound being an organic phosphorus compound selected from the group consisting of compounds of formula II

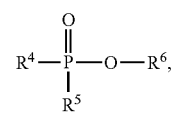

wherein
R⁴ is hydrogen or an aromatic 6-membered ring which may be up to pentasubstituted by a $C_1$-$C_4$-alkyl and/or $C_5$-$C_8$-cycloalkyl groups, R⁵ is an aromatic 6-membered ring optionally up to pentasubstituted by at least one of $C_1$-$C_4$-alkyl and $C_5$-$C_8$-cycloalkyl groups,
and R⁶ is hydrogen, an alkali metal, an alkaline earth metal, aluminum, ammonium or ammonium optionally substituted with up to four of at least one selected from $C_1$ to $C_4$ alkyl and $C_5$ to $C_8$ cycloalkyl groups.

* * * * *